Figure 1:

United States Patent [19]

Wu

[11] 4,430,511

[45] Feb. 7, 1984

[54] METHOD FOR PRODUCING TEREPHTHALIC ACID

[75] Inventor: Yulin Wu, Bartlesville, Okla.

[73] Assignee: Phillips Petroleum Company, Bartlesville, Okla.

[21] Appl. No.: 410,765

[22] Filed: Aug. 23, 1982

Related U.S. Application Data

[62] Division of Ser. No. 894,068, Apr. 6, 1978, Pat. No. 4,356,105.

[51] Int. Cl.³ ............................................. C07C 51/347
[52] U.S. Cl. .................................... 562/481; 252/308; 252/314
[58] Field of Search ................. 252/308, 314; 562/481

[56] References Cited

U.S. PATENT DOCUMENTS

| | | | |
|---|---|---|---|
| 2,368,560 | 1/1945 | Minich | 252/308 |
| 2,610,900 | 9/1952 | Cross, Jr. | 302/66 |
| 3,206,256 | 9/1965 | Scott | 302/66 |
| 3,746,752 | 7/1973 | Kuper | 562/481 |
| 3,751,457 | 8/1973 | Marwil | 562/481 |
| 3,781,341 | 12/1973 | Wu et al. | 562/481 |
| 3,787,487 | 1/1974 | Sherk | 562/481 |
| 3,873,609 | 3/1975 | Wu et al. | 562/481 |

OTHER PUBLICATIONS

Dalle Valla, *Micromeritics*, (1943). p. 286.

*Primary Examiner*—Natalie Trousof
*Assistant Examiner*—Vera C. Clarke

[57] ABSTRACT

A low viscosity slurry of aggregates of crystals in a dispersant is prepared by first making aggregates of crystals by the method of direct precipitation, the shape of the aggregates being granular, and then mixing the aggregates and the dispersant.

3 Claims, 1 Drawing Figure

METHOD FOR PRODUCING TEREPHTHALIC ACID

This is a division of application Ser. No. 894,068, filed Apr. 6, 1978, now U.S. Pat. No. 4,356,105.

FIELD OF THE INVENTION

This invention relates to a method of preparing low viscosity slurries and to the slurries so prepared.

BACKGROUND OF THE INVENTION

Transporting crystals in the form of slurries is often a convenient method of transporting various materials to places where they are needed in various commercial operations. One example is the transportation of reactants such as potassium benzoate (KBz) used in the preparation of terephthalic acid (TPA). TPA is important in the production of polyester fibers.

For such transporting, it is important that the slurries have low viscosities. Low viscosity slurries, in general, (as compared with high viscosity slurries) are more easily pumped through transfer tubes, exhibit less deposition of crystals and decomposed material on the walls of the transfer tubes, and do not require such high transfer tube temperatures. Therefore, for these reasons, low viscosity slurries are preferable.

The prior art has taught that average particle size and particle shape are factors which affect viscosity. It is also known that for a given material having a given particle shape, as the size of the average particle decreases, the viscosity of the slurry produced therefrom increases.

However, the prior art has not determined that when the material used to form the particles is held constant, a slurry produced from particles having a plate shape in the slurry will have a higher viscosity than a slurry produced from particles having a granular shape in the slurry. Furthermore, the problem of lowering viscosity in a particular slurry has not been solved for all materials.

Certain materials in the form of thin, plate-shaped individual crystals have been found to form high viscosity slurries. For example, when an aqueous potassium benzoate solution is mixed with hot terphenyl, a high viscosity slurry is formed which contains thin, plate-shaped individual crystals which range in size from about 10 to about 2000 $\mu$m in diameter, the majority lying within the range from about 200 to about 1100 $\mu$m.

It is an object of this invention to make a low viscosity slurry of crystals in a suitable dispersant.

It is also an object of this invention to transport potassium benzoate crystals which are used in a step in the production of valuable terephthalic acid.

STATEMENT OF THE INVENTION

According to the invention, a slurry is prepared by mixing granular shaped aggregates of crystals prepared by the method of direct precipitation with a dispersant, the material from which the granular shaped aggregates are made being such that it forms thin, plate-shaped individual crystals when a dilute aqueous solution thereof is mixed with a dispersant in which said material is insoluble and to which said material is inert, and water is evaporated therefrom. The invention is applicable, for example, to the preparation of slurries of crystals of an alkali or alkaline earth metal salt of an aromatic mono- or polycarboxylic acid in dispersants which are aromatic compounds. In one embodiment, a low viscosity slurry of potassium benzoate crystals in terphenyl is prepared and then used in the preparation of terephthalic acid.

When compared with a slurry of crystals prepared by mixing an aqueous potassium benzoate solution with hot terphenyl and allowing substantially all of the water to evaporate therefrom, a slurry prepared by producing granular shaped aggregates of crystals by the method of direct precipitation followed by filtration or centrifugation and mixing with hot terphenyl has a much lower viscosity. The difference here is believed to be due primarily to the difference in particle shape, the aggregates of crystals being more granular, as opposed to plate-like. The size range of aggregates of crystals of potassium benzoate prepared according to the invention was about 250 to about 850 $\mu$m; and this size range was included within the size range of the majority of the thin, plate-shaped individual potassium benzoate crystals (which size range was about 200 to about 1100 $\mu$m).

The particles which are compared in this invention are the particles as they are found in their respective slurries. The crystals prepared by the method of mixing an aqueous potassium benzoate solution with hot terphenyl and evaporating substantially all of the water therefrom are observed in the terphenyl to be very thin and quite flexible individual plate-like crystals (plate-like crystals being smooth, flat, and with substantially uniform thickness). It is believed that the individual, thin plate-like crystals formed in the comparative examples, described below, by adding potassium benzoate and water to terphenyl and (with stirring) evaporating the water are substantially identical to those prepared in the prior art method of adding an aqueous potassium benzoate solution to hot terphenyl and allowing the water to evaporate. On the other hand, the aggregates of crystals prepared according to the invention remain aggregates in the slurry and have a shape in the slurry which is granular, as opposed to plate-like. When such granular aggregates prepared according to the invention from potassium benzoate have sizes within the range from about 20 mesh to about 60 mesh, i.e., about 250 to about 850 $\mu$m, the slurry prepared from such crystals in terphenyl has a much lower viscosity than the viscosity of a slurry of thin, flexible, plate-shaped crystals having sizes within the range from about 10 $\mu$m to about 2000 $\mu$m in terphenyl. The "size" of an individual crystal or of a crystal aggregate is used herein to mean the measure of the largest linear dimension thereof in any one direction.

Referring to the drawing, a photograph of a typical granular-shaped aggregate of KBz prepared according to the invention is included. The aggregate of KBz shown in FIG. I was prepared by direct precipitation (followed by filtration), as described in Example I (below); and the magnification was 200x. The aggregate is composed of essentially rectangular, flat and smooth individual, thick, plate-shaped crystals, each individual rectangular-shaped crystal having a thickness which is substantial in comparison with (i.e., at least about 1/20 of) its length and width and having a size which is substantial in comparison with the size of the aggregate in which the individual crystal is found. Because the aggregates of crystals do not separate appreciably upon being placed into the dispersant, the size and shape of these aggregates are important factors in the determination of the viscosity of the resultant slurry.

PREFERRED EMBODIMENTS OF THE INVENTION

We have found that particle shape is a highly important factor in the viscosity of slurries prepared from those crystals. Although the following description of the invention is written particularly in terms of potassium benzoate (which in some cases forms thin, plate-shaped individual crystals), the invention is not to be construed as so limited. Rather, it is expected that whenever the material to be dispersed in a slurry is such that it sometimes forms plate-shaped individual crystals which are very thin, the viscosity of the slurry prepared from that material in the chosen dispersant can be lowered by first preparing granular shaped aggregates of crystals of the material and then mixing the aggregates with the dispersant. It is expected that granular shaped aggregates of crystals will in general have a lower viscosity than plate-shaped individual crystals of the same material when the individual crystals and the aggregates are in the same size range.

Materials which are known to form plate-shaped individual crystals upon mixing of the solution of the material with a dispersant, but which form granular-shaped aggregates of crystals when the crystals are formed by direct precipitation and are then filtered or centrifuged, include the salts of certain aromatic mono- or polycarboxylic acids. Such salts are those having the formula

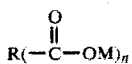

wherein R is an aromatic or alkyl aromatic group having 6 to about 35 carbon atoms, M is an alkali or alkaline earth metal and n is the integer 1, 2, 3, or 4. These salts are readily prepared from the corresponding acids. Such acids include, for example, benzoic acid, 2-naphthalene carboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, and 2,4-dibutylbenzene-1,3,5-tricarboxylic acid.

Excellent results have been obtained with potassium benzoate. It is expected that similar good results will be obtained with the other alkali metal salts as well as the alkaline earth metal salts of the above-listed acids.

In all the above-mentioned carboxylic acid salts, the aromatic ring may carry alkyl radicals, in addition to the carboxylate groups, provided that these alkyl radical substituents do not bring about a decomposition of the molecule at temperatures equal to or lower than the reaction temperature.

When the aromatic monocarboxylic acid salts are used as starting materials for the process according to this invention, the low viscosity slurry so produced can, for example, be sent to a disproportionation reactor; and the products from the disproportionation reaction are industrially valuable alkali metal salts of dicarboxylic acids which can be readily converted to the corresponding dicarboxylic acids; i.e., for example, potassium benzoate can be disproportionated to form dipotassium terephthalate, which is readily converted to terephthalic acid. The disproportionation of the alkali metal carboxylate crystals in the organic dispersant to an aromatic polycarboxylate is accomplished by any suitable method. For example, the method described in Wu et al, U.S. Pat. No. 3,873,609 using a disproportionation catalyst, such as zinc benzoate, can be utilized.

The term "direct precipitation" is used herein to mean a method of crystal or crystal aggregate formation wherein a solute is dissolved in at least one solvent and wherein at least some of the solvent is evaporated, thereby resulting in the formation of crystals. Generally used with the method of direct precipitation is a step of removal of the formed crystals from the solvent. Inherent in the method of direct precipitation is the provision that evaporation be done relatively slowly, which provision is very different from the relatively fast evaporation occurring when a drum dryer is used in crystal formation. Furthermore, a second liquid in which the solute is insoluble and/or in which the first and second liquids form two phases should not be present in any significant amount in the method of direct precipitation since such a material may interfere with the required slow crystal formation.

In the practice of the process of this invention, any suitable variation of the direct precipitation method can be utilized to form the desired aggregates of crystals. For example, aqueous solution of potassium benzoate can be partially evaporated to form the desired aggregates of crystals, and seeding can be used if desired. Also, if desired, slow stirring may be used. These aggregates can be separated from the remaining solution (mother liquor) such as by filtration or centrifugation. The recovered mother liquor can be recycled to the evaporator.

Separation of the aggregates of crystals from the remaining solution can be accomplished by filtration using any suitable filtration device or by centrifugation using any suitable centrifuge.

The concentrations of aqueous solutions of potassium benzoate to be evaporated to form aggregates can range from very dilute solutions to saturated solutions and will generally range from about 10 to about 115 g. of potassium benzoate per 100 g. of water. (Temperatures up to about 100° C. may be required at higher potassium benzoate concentrations to achieve essentially complete solution). The evaporation temperature will usually be broadly from about 30° to about 110° C. and preferably from about 60° to about 105° C. Atmospheric, superatmospheric, or subatmospheric pressures can be used during the evaporation to maintain a reasonable rate of evaporation. Excessively high rates of evaporation could yield aggregates of crystals having shapes outside the scope of this invention, and excessively slow evaporation rates are undesirable for economic reasons. Any suitable agitation or stirring device can be used during the evaporation; and a flow of a gas, such as air, nitrogen, or carbon dioxide over the solution during evaporation is preferably used.

Aggregates of potassium benzoate crystals can be used with terphenyl for slurry formation either as the centrifuged or filtered aggregates or as a partially or completely dry aggregate. The aggregates containing water can be dried in air or in an oven at atmospheric or reduced pressure. For economic reasons, the use of aggregates containing a minor amount of water is preferred for the preparation of the potassium benzoate/terphenyl slurry.

The moisture content of the aggregates of crystals to be utilized for the preparation of low viscosity slurries of potassium benzoate in terphenyl should be below about 30 weight percent, and preferably below about 25 weight percent water, based on the total material (i.e., crystals and water) weight. Throughout this application, water content of crystal aggregates is given as a percent of water based on the total weight of the crystal aggregates plus their water content.

The size of the aggregates of crystals prepared in the practice of this invention can be any size that yields a low viscosity slurry in a dispersant. When KBz crystals are prepared by direct precipitation and then filtered or centrifuged, the resulting aggregates are generally in the range from about 20 mesh to about 60 mesh, U.S. Standard Sieves, (i.e., about 850 to about 250 $\mu$m) and appear to have a granular shape (i.e., having three substantial dimensions, unlike thin, plate-shaped or needle-shaped crystals). Small quantities, (for example, below about 10 weight percent) of thin, plate-shaped individual KBz crystals may be present and not significantly affect viscosity.

A dispersant useful for the preparation of the slurry is one which does not decompose under the conditions of the process, which does not dissolve the crystals, which is inert to the reactants, and which is relatively high-boiling. Suitable dispersants for the alkali metal salts of aromatic carboxylic acids include aromatic hydrocarbons selected from the group comprising aromatic compounds having three or more aromatic rings, polynuclear aromatics and mixtures thereof. Examples of such organic dispersants include terphenyls, quaterphenyl, pentaphenyls and heavier polyphenyls, binaphthyls, naphthalene, anthracene, phenanthrene, pyrene, triphenylene, chrysene, perlyene, pentacene and mixtures thereof.

It is desirable that the dispersant remain in the liquid state throughout the process; thus, it should have a melting point below the lowest temperature employed in the process and a boiling point above the highest temperature employed in the process. For potassium benzoate, the dispersant should have a melting point below about 150° C.; and terphenyl is a suitable dispersant for potassium benzoate.

Mixtures of two or more suitable dispersant compounds can be utilized to reduce the melting point of the dispersant. It is also desirable that the dispersant have a relatively high boiling point in order to aid in maintaining the reaction pressure at a low level. For use with alkali metal carboxylate crystals, the boiling point of the dispersant should be above about 200° C.

When alkali metal carboxylate materials are used in the invention, the organic dispersant is present in the slurry in an amount in the range from about 25 to about 80 percent by weight of the total weight of the slurry and preferably in an amount in the range from about 60 to about 75 percent by weight of the total weight of the slurry. It is to be understood that when the viscosities of two slurries are compared herein, the slurries being compared have the same percent by weight of dispersant to total slurry weight.

The slurry is formed by mixing a suitable dispersant with the prepared aggregates of crystals. Any suitable method of mixing a solid with a liquid can be used to form the slurry provided that the crystal aggregates are not appreciably separated on mixing. For example, if a batch reactor is employed, the dispersant, in liquid form, is added to the reactor; then the solid salt, such as potassium benzoate, is added to the reactor while the liquid is being stirred. If a continuous reactor is employed, the solid is metered into a separate stirred mix tank which contains the liquid dispersant; and the produced slurry is then introduced into the reactor.

EXAMPLES

The potassium hydroxide and benzoic acid used in the following examples were commercially available materials and were used without further purification. Potassium benzoate (KBz) was prepared by mixing equimolar amounts of benzoic acid and potassium hydroxide in water and by then evaporating the water. The terphenyl used was a mixture of isomers and contained 75.3 weight percent m-terphenyl, 19.9 weight percent o-terphenyl, and 4.4 weight percent p-terphenyl.

In each example, slurries were prepared from hot terphenyl (at the temperature indicated in each specific example) and potassium benzoate in a 2:1 weight ratio; and viscosities were determined with a Synchro-Lectric viscometer, Model LV-1, with spindle no. 1. The slurries were placed in a vessel which was held in a constant temperature bath and were stirred until just before the viscosity determination. The temperature in the bath is given below in each example.

EXAMPLE I

A mixture of 366 g (3 moles) benzoic acid and 198 g (3 moles) potassium hydroxide (85 percent purity) in 2000 g distilled water was stirred at 60° to 68° C. under a stream of air until the solution became viscous. The mixture was cooled and filtered to yield 276.6 g of solid. A portion of the solid was air dried overnight to remove excess water and was then oven dried at 120°–180° C. for two hours. A particle size analysis of the air dried and oven dried KBz aggregates using sieves gave the following results:

TABLE I

| Mesh[a] No. | Opening, $\mu$m | Weight Percent Air Dried[b] | Weight Percent Oven Dried[c] |
|---|---|---|---|
| 14 | 1400 | 0.84 | 0.63 |
| 20 | 850 | 11.91 | 12.64 |
| 30 | 600 | 17.32 | 20.82 |
| 40 | 425 | 24.55 | 26.70 |
| 50 | 297 | 27.42 | 24.24 |
| 60 | 250 | 3.38 | 9.15 |
| 80 | 180 | 11.17 | 4.71 |
| 100 | 150 | 3.41 | 1.11 |

[a]U. S. Standard Sieve Series, A.S.T.M. Specifications, Fisher Scientific Co.
[b]Air dried to remove excess water overnight at room temperature (about 25° C.). The moisture content after drying was about 2 weight percent based on the total material weight.
[c]Oven dried, 120–180° C. for 2 hours. The moisture content was less than 0.1 weight percent based on the total material weight.

A slurry of the oven dried aggregates in terphenyl in a 2:1 weight ratio of terphenyl to potassium benzoate was prepared at 150° C. The slurry viscosity was determined at 200° C. and was 9.7 centipoise.

In a separate run, a mixture of 61 g (0.5 mole) benzoic acid and 34.6 g (0.52 mole) potassium hydroxide in 146 g of distilled water was stirred at 80°–85° C. under a stream of air until 115 g of water had evaporated. The resulting mixture was cooled to yield solid potassium benzoate which contained 34 weight percent water based on the total material weight. A portion of the solid was removed for slurry viscosity measurement, and the rest of the solid was filtered to remove excess water. The filtered solid contained about 23 weight percent water based on the total material weight. Separate slurries of the wet KBz solid, and of the filtered KBz solid in terphenyl were prepared at 150° C. The slurry viscosities at 200° C. were 225 centipoise for the wet solid and 14.8 centipoise for the filtered solid.

The results of these runs demonstrate operability of this invention for the preparation of low viscosity KBz/terphenyl slurries using either dry aggregates of crystals (<0.1 weight percent water) or aggregates of crystals containing about 23 weight percent water formed by evaporation of aqueous solutions of KBz and filtration of the precipitated crystals. The critical nature of the moisture content of the KBz crystal aggregates is demonstrated by the much higher viscosity of a terphenyl slurry prepared from wet KBz crystal aggregates containing about 34 weight percent water.

EXAMPLE II

A mixture of 100 g (0.62 mole) KBz and 100 g water was heated at 106° C. until 48 g of water had evaporated. The resulting mixture was centrifuged in a hot centrifuge (manufactured by Chemical Rubber Company) with a medium heat setting to separate the KBz aggregates from the liquid. The KBz crystal aggregates were dried in an oven at 150° C. for about 2 hours. The resulting dry KBz aggregates contained less than 0.1 weight percent water based on the total material weight. A slurry of the dry KBz aggregates in terphenyl was prepared at 150° C., and the viscosity at 200° C. was 13 centipoise.

In order to determine the effect of prolonged slurry stirring times at elevated temperatures, the above-described slurry was charged to a 300 ml stainless steel autoclave. The slurry was heated to 93.3° C., the autoclave sealed, and the mixture heated at 217° C. for 3 hours with stirring at 912 rpm. The slurry was removed from the autoclave, and the slurry viscosity was measured at 200° C. to be 14 centipoise. The slurry was again charged to the 300 ml stainless steel autoclave. The slurry was heated at 218° C. for 3 hours with stirring at 2326 rpm. The slurry was removed from the autoclave and the slurry viscosity at 200° C. was determined to be 18.7 centipoise.

The results of this example demonstrate operability of this invention for the preparation of low viscosity KBz/terphenyl slurries using aggregates of KBz crystals prepared by direct precipitation of an aqueous KBz solution and centrifugation. In addition the stability of the KBz aggregates in the slurry to extended heating with stirring is demonstrated.

COMPARATIVE EXAMPLE A

According to a prior art method of slurry preparation, a mixture of 50 g terphenyl, 25 g (156 mmole) KBz, and 12.5 g water was charged to a 300 ml autoclave and heated to 216° C. with stirring. Water was removed through a valve at a rate of 4.9 ml/hr. After about 3 hours, the autoclave was opened and the KBz/terphenyl slurry was removed for viscosity measurement. The slurry viscosity at 200° C. was 1533 centipoise. The crystals which resulted from this prior art method were observed in the slurry to be thin, flexible, plate-shaped individual crystals.

The result of this run (as compared with Examples I and II) shows that a high viscosity slurry is obtained by mixing a particular KBz solution and terphenyl and then evaporating the water. It is believed that this method of slurry preparation (which is also used in Comparative Example B) is substantially equivalent to the prior art method of mixing an aqueous KBz solution with hot terphenyl and allowing the water to evaporate.

COMPARATIVE EXAMPLE B

Also according to a prior art method of slurry preparation, a mixture of 50 g terphenyl, 25 g (156 mmole) KBz, and 25 g water was charged to a 300 ml autoclave and heated at 216° C. with stirring. Water was removed at a rate of 8.9 ml/hr. After about 3 hours the autoclave was opened and the KBz/terphenyl slurry was removed for viscosity measurement. The slurry viscosity at 200° C. was 106 centipoise. These crystals which formed were very thin, flexible, individual and plate-shaped.

The result of this run (as compared with Examples I and II) shows that a relatively high viscosity slurry is obtained by mixing a particular KBz solution and terphenyl and then evaporating the water.

Although this invention has been described in detail with various illustrations, it is not to be limted by those illustrations. Rather, the invention is intended to include modifications which would be apparent to one skilled in the art.

What is claimed is:

1. In a method of producing terephthalic acid wherein potassium benzoate is disproportionated to form dipotassium terephthalate which is converted to terephthalic acid, the improvement comprising:
    (a) forming aggregates of crystals of potassium benzoate by the method of direct precipitation;
    (b) mixing said aggregates of said crystals with terphenyl to form a low viscosity slurry; and then
    (c) transporting said low viscosity slurry to a disproportionation reactor.

2. A method as in claim 1 further characterized by directly precipitating granular shaped aggregates of plate shaped crystals of said potassium benzoate.

3. A method as in claim 1 wherein the aggregates of said crystals of potassium benzoate have a water content of less than about 30% by weight.

* * * * *